United States Patent [19]

Fukakusa et al.

[11] Patent Number: 5,184,263
[45] Date of Patent: Feb. 2, 1993

[54] LOADING METHOD AND DRIVE UNIT FOR A FLOATING MAGNETIC HEAD FOR LOADING THE MAGNETIC HEAD WHILE PREVENTING CONTACT BETWEEN THE MAGNETIC HEAD AND A MAGNETIC DISK

[75] Inventors: Masaharu Fukakusa; Hiroshi Tomiyasu, both of Kumamoto, Japan

[73] Assignee: Matsushita Electric Industrial Co., Ltd., Osaka, Japan

[21] Appl. No.: 610,576

[22] Filed: Nov. 8, 1990

[30] Foreign Application Priority Data

Nov. 14, 1989 [JP] Japan .................................. 1-295852

[51] Int. Cl.⁵ .......................... G11B 5/54; G11B 5/60; G11B 21/12; G11B 21/21
[52] U.S. Cl. ....................................... 360/103; 360/105
[58] Field of Search .................. 360/103, 75, 104, 105

[56] References Cited

U.S. PATENT DOCUMENTS

| | | | |
|---|---|---|---|
| 3,990,106 | 11/1976 | Kameyama et al. | 360/103 |
| 4,363,045 | 12/1982 | Herman | 360/105 |
| 4,843,502 | 6/1989 | Tagawa | 360/103 |

*Primary Examiner*—Robert S. Tupper
*Attorney, Agent, or Firm*—Stevens, Davis, Miller & Mosher

[57] ABSTRACT

A method of loading a magnetic head for the purpose of floating the magnetic head on a rotating magnetic recording medium, in which the magnetic head is brought close to a magnetic recording medium from a venting end section of an air flow area in order to obviate the area in which contact between the magnetic recording medium and the magnetic head is prevented and the magnetic head is made to float on the magnetic recording medium.

5 Claims, 8 Drawing Sheets

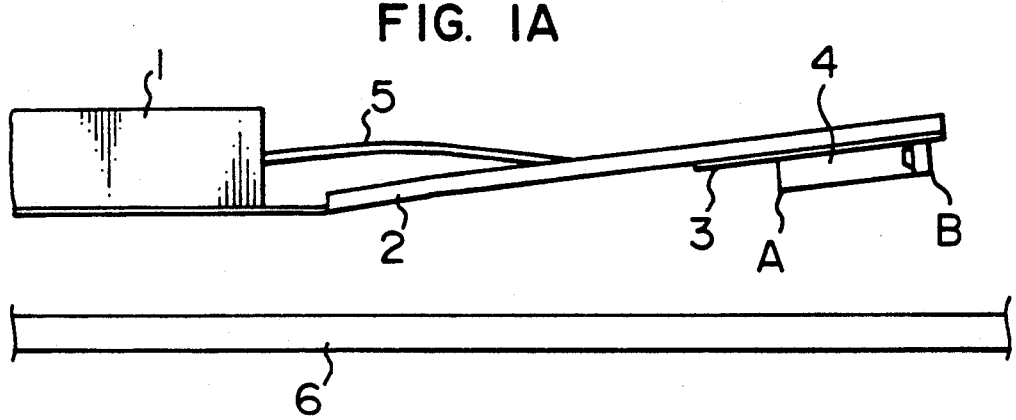
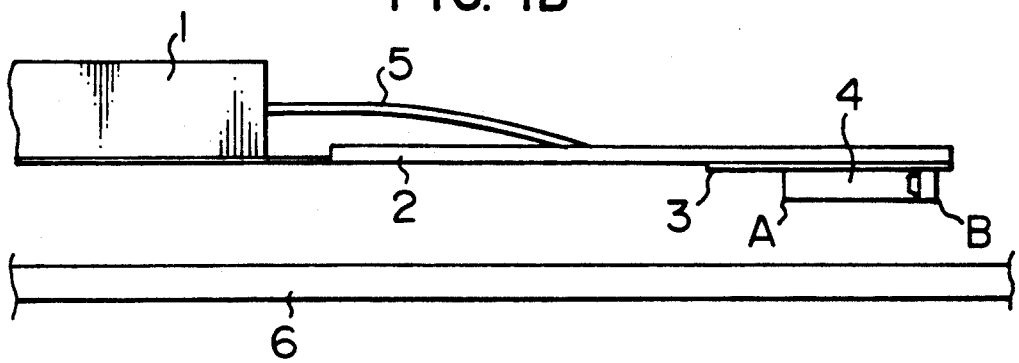
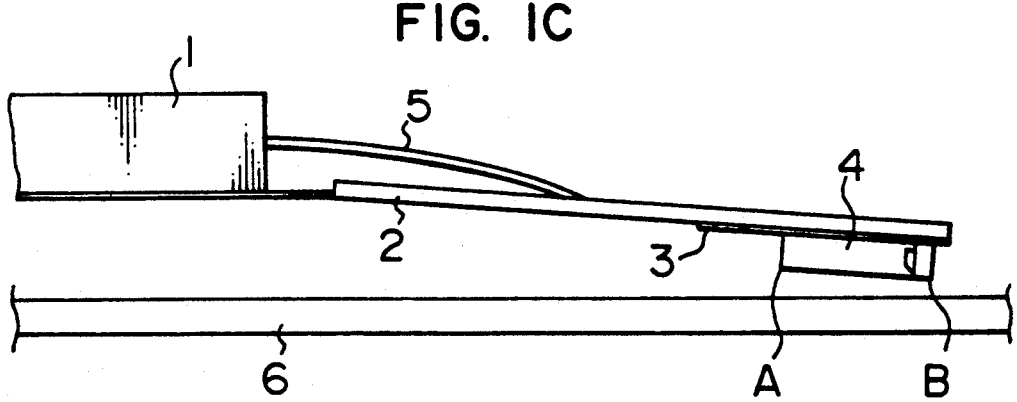
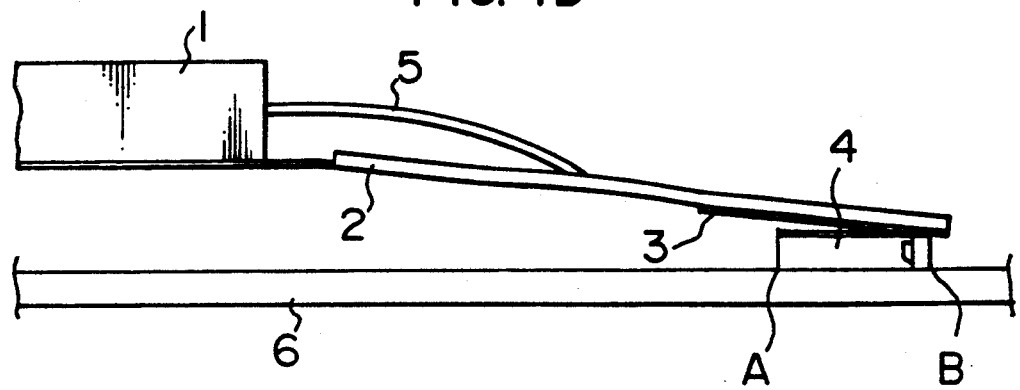

LOADING METHOD AND DRIVE UNIT FOR A FLOATING MAGNETIC HEAD FOR LOADING THE MAGNETIC HEAD WHILE PREVENTING CONTACT BETWEEN THE MAGNETIC HEAD AND A MAGNETIC DISK

BACKGROUND OF THE INVENTION

1. Field of the Invention

The present invention relates to a method of loading a magnetic head for use in a magnetic recording/reproducing apparatus that allows data to be recorded on a magnetic recording medium and to be read out from the magnetic recording medium by means of a magnetic head. The present invention also relates to a magnetic disk drive unit using a magnetic head.

2. Description of the Related Art

FIG. 7 is a perspective view showing a conventional magnetic disk drive unit. In FIG. 7, reference numeral 1 denotes an arm, and 2 denotes a flexure consisting of a leaf spring and mounted on the arm 1. The flexure 2 is adapted to be bent near the bonding section thereof with the arm 1. Reference numeral 3 denotes a gimbal disposed on the front end part of the flexure 2, and 4 denotes a magnetic head fixed to the gimbal 3. The magnetic head 4 is constructed as shown in FIG. 8. In FIG. 8, reference numeral 4a denotes a slider main body composed of a magnetic material of ferrite or the like. On the slider main body 4a, a U-shaped float rail 4b that causes generation of a positive pressure is disposed, on the float rail 4b, depressions 4c are formed. Reference numeral 4d is a recess surrounded by the float rail 4b, and a negative pressure is generated in the recess 4d. Reference numerals 4e and 4f are cores bonded to the slider main body 4a via non-magnetic materials 4g and 4h, respectively, which serve as magnetic gaps. Reference numeral 4i denotes a lead wire wound around the core 4e. In this case, only the core 4e performs magnetic recording and reproduction. Air flows toward the side (the downstream end B) on which the lead wire 4i is wound from the opposite side (the upstream end A). In FIG. 7, reference numeral 5 denotes a flexure pressing member mounted on the arm 1 and abutting against the flexure 2 on the side remote from the disk 6. The flexure pressing member 5 is formed of a wire made of a shape memory alloy, being bent in the form of the letter V. A shape is memorized in this flexure pressing member 5 so that the latter presses against the flexure 2 when its shape has recovered so as to displace the magnetic head 4 toward the disk 6.

The operation of the magnetic disk drive unit constructed as described above will now be explained. First, the loading time will be explained. At first, the magnetic head 4 is held so that it is separated from the disk 6, as shown in FIG. 9A. Next, after the rotational speed of the disk 6 reaches a predetermined value, the flexure pressing member 5 is energized. Then, the flexure pressing member 5 itself produces heat and brings about a shape recovery. Then, the flexure pressing member 5 presses against and bends the flexure 2 toward the disk 6, bringing the magnetic head 4 closer to the disk 6. This circumstance is shown in FIG. 9B. Next, when the gap between the magnetic head 4 and the disk 6 reaches a predetermined value, the flexure pressing member 5 is automatically deenergized, thereby causing the flexure pressing member 5 to cease pressing against the flexure 2. However, if the magnetic head comes to this position, a negative pressure that brings the magnetic head 4 close to the disk 6 is generated in the magnetic head 4. If the magnetic head 4 comes too close to the disk 6, a positive pressure is generated in the magnetic head 4. At this time, the negative pressure balances with the resultant of the positive pressure and the force which urges the magnetic head 4 to move away from the disk, so that the magnetic head 4 enters into a floating state. These circumstances are shown in FIG. 9C. When a predetermined recording or reproduction operation by the magnetic head 4 is terminated, the rotational speed of the disk 6 decreases, and the magnetic head 4 is lifted off from the disk 6 by the recovery force of the flexure 2. The magnetic disk drive unit constructed as described above is designed such that when the side of the magnetic head 4 opposing the recording medium is nearly parallel to the disk 6 after the magnetic head 4 is brought closer, the magnetic head 4 floats exactly on the disk 6.

In the conventional method described above, however, since the magnetic head 4 comes closer to the disk at downstream end A, the magnetic head 4 moves perpendicularly to the disk 6 in the air flow area formed on the surface of the disk 6 by the rotation of the disk 6. A sufficient positive pressure is not generated in the magnetic head 4 by the time the magnetic head 4 reaches a floating position, and the magnetic head 4 is urged to make contact with the disk 6, thus sometimes causing damage to the disk 6. Therefore, the area in which the magnetic head 4 can float during a loading time must be formed on the disk 6. A problem arises, however, in that, namely, the storage capacity of the disk 6 is insufficient. It may be considered that the magnetic head 4 is gradually brought closer to the disk 6 in order to prevent the magnetic head 4 from making contact with the disk. However, a problem arises, in that, namely, the loading time is increased, thus reading and writing of data are delayed.

SUMMARY OF THE INVENTION

An object of the present invention is to provide a method of loading a magnetic head which is capable of preventing the magnetic head from being brought into contact with a magnetic recording medium during loading, that is not required to provide an area for floating the magnetic head on the magnetic recording medium, and that is capable of increasing the capacity of the magnetic recording medium. Another object of the invention is to provide a magnetic disk drive unit utilizing the above-mentioned method.

These and other objects, features and advantages of the present invention will become clear when reference is made to the following description of the preferred embodiments of the present invention, together with reference to the accompanying drawings.

BRIEF DESCRIPTION OF THE DRAWINGS

FIGS. 1A through 1D are side views showing a method of loading a magnetic head in an embodiment of the present invention;

DESCRIPTION OF THE PREFERRED EMBODIMENTS

Figure 2:
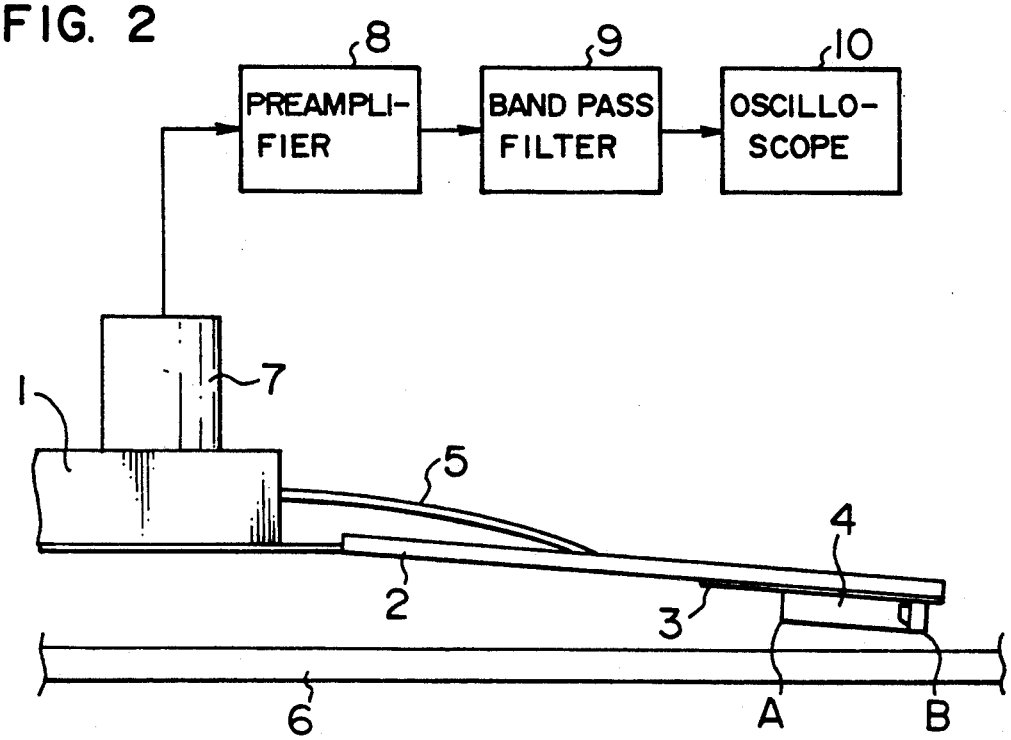
FIG. 2 is a block diagram of an apparatus employed in an experiment that detects the collision of the magnetic head with a magnetic recording medium.

FIGS. 1A, 1B, 1C, and 1D are side views showing steps of a method of loading a magnetic head in an embodiment of the present invention. In FIGS. 1A, 1B, 1C, and 1D, reference numeral 1 denotes an arm, 2 denotes a flexure, 3 denotes a gimbal, 4 denotes a magnetic head, 5 denotes a flexure pressing member, and 6 denotes a disk. In this embodiment, individual parts are placed so that when the disk 6 becomes parallel to the side of the magnetic head 4 opposing the recording medium, the magnetic head 4 and the disk 6 are separated from each other sufficiently so as not to be affected by an air flow area formed on the surface of the disk. When the magnetic head 4 enters into the air flow area, it comes closer to the disk 6, first, at its downstream end B.

A method of loading a magnetic head in an embodiment of the present invention will now be explained. At first, a step which is similar to that of the prior art is effected, as shown in FIG. 1A. The gap between the arm 1 and the disk 6 is wider in this embodiment than in the prior art. Next, the flexure pressing member 5 is energized to cause the flexure pressing member 5 itself to produce heat and bring about a shape recovery. Then, the flexure pressing member 5 presses against and bends the flexure 2 toward the disk 6, causing the magnetic head 4 to approach the disk 6. At a second step shown in FIG. 1B, the surface of the magnetic head 4 opposing the recording medium is oriented parallel to the surface of disk 6. If the flexure pressing member 5 further presses and bends the flexure 2, the magnetic head 4 comes closer to the disk 6, first, at downstream end B. This step is shown in FIG. 1C. When the flexure pressing member 5 further presses against and bends the flexure 2, the magnetic head 4 comes closer to the disk 6 and enters a floating state (in the loaded position shown in FIG. 1D). At this time, the flexure pressing member 5 is automatically deenergized, thereby causing the flexure pressing member 5 to cease pressing against the flexure 2.

Figure 3A:
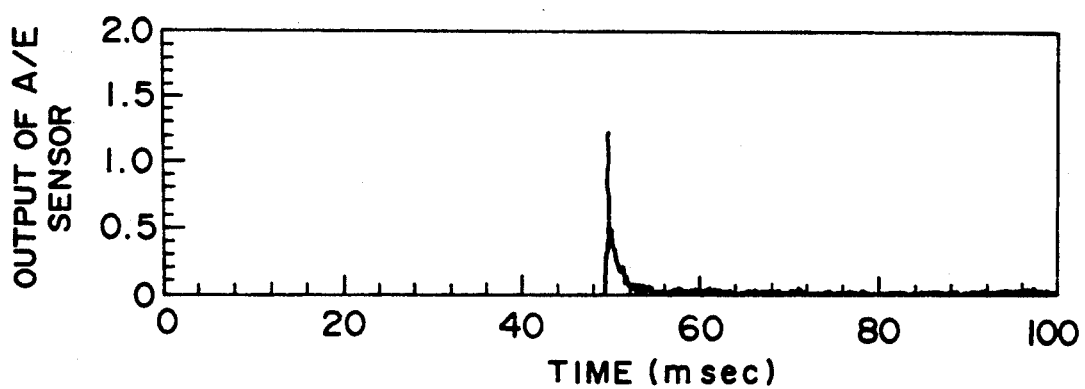
FIGS. 3A and 3B are graphs showing the circumstances of the collision, respectively, in the prior art and the illustrated embodiment.
Figure 3B:
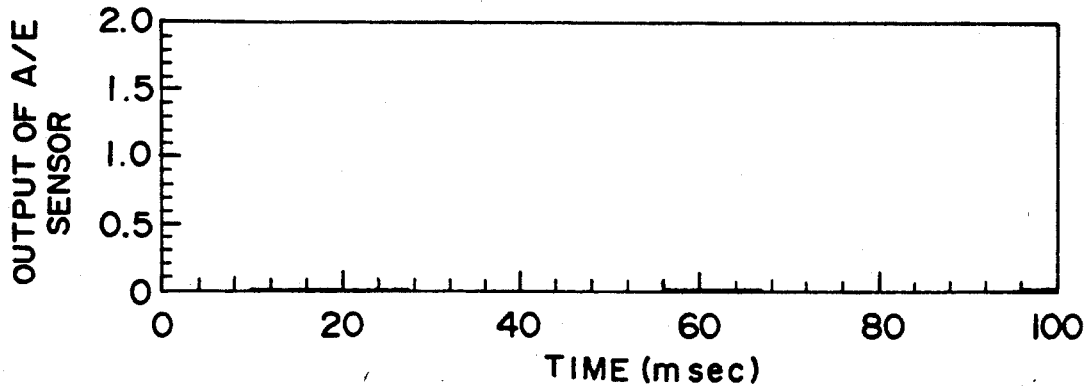
Figure 9A:
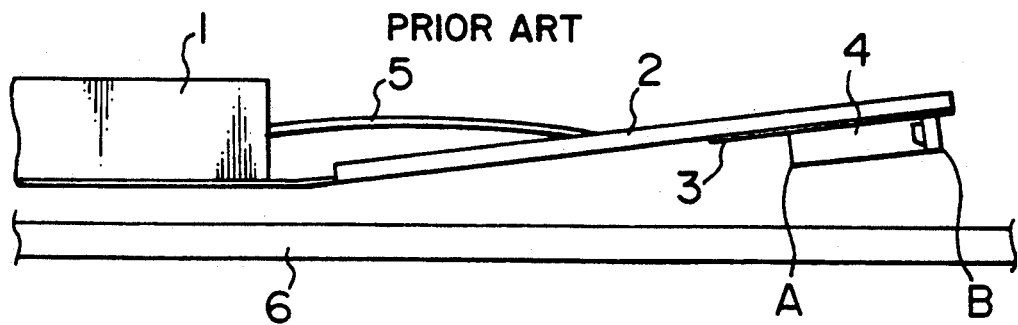
FIGS. 9A through 9C are side views showing the conventional loading method.
Figure 9B:
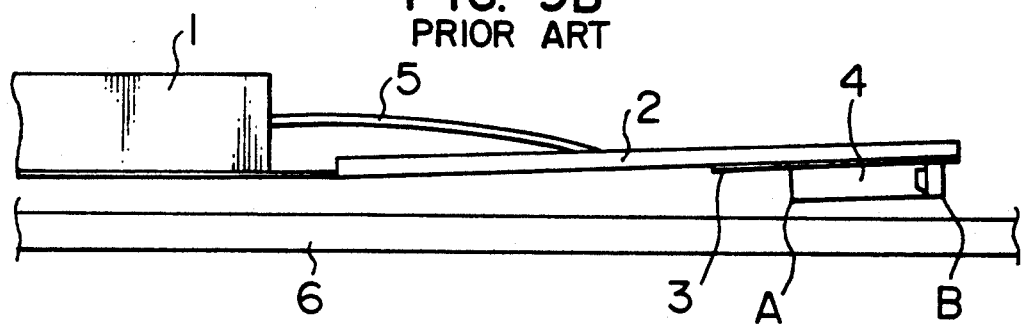
Figure 9C:
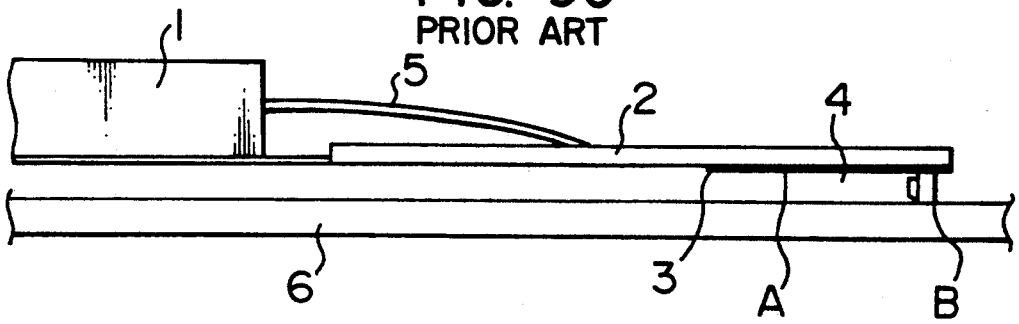

As described above, if the magnetic head 4 is brought closer to the disk 6 first at the downstream end B before the magnetic head 4 enters into a floating state, there is less likelihood of the magnetic head 4 being brought into contact with the disk 6 immediately before the magnetic head 4 enters into the floating state (in a parked position shown in FIG. 1A). This fact was confirmed by the following experiment. FIG. 2 is a block diagram of the apparatus used in this experiment. In FIG. 2, reference numeral 7 denotes a sensor, mounted on the arm 1, that detects vibrations and outputs a signal corresponding to the vibrations, 8 denotes a preamplifier that amplifies signals from the sensor 7, 9 denotes a band pass filter that filters signals from preamplifier 8 so as to pick up natural vibrations which might be cause if the magnetic head contacts the disk 6, and 10 denotes an oscilloscope on which the signals picked up by the band pass filter are displayed. The results of the measurement by the apparatus employed in the experiment are shown in FIGS. 3A and 3B. FIGS. 3A and 3B show the results of the measurement when loading is performed, respectively, according to the method of the prior art, which are shown in the order of FIGS. 9A, 9B, and 9C, and according to the method in this embodiment. The abscissa is the time axis, and the ordinate represents the output from the sensor 7. The measurement was made just before the magnetic head 4 enters into the floating state. As can be seen from FIG. 3A, in the method of the prior art, vibrations caused by contact between the magnetic head 4 and the disk 6 were detected. However, according to the method of this embodiment shown in FIG. 3B, no vibrations due to contact between the magnetic head 4 and the disk 6 were detected.

The reason why no collision occurs during loading in the method according to this embodiment will be explained below in comparison with the method of the prior art.

Figure 4A:
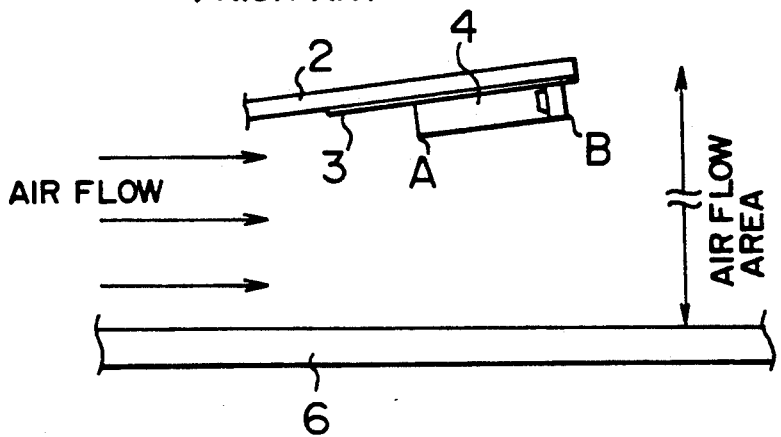
FIGS. 4A and 4B are side views showing how the magnetic head moves according to the loading method of the prior art.
Figure 4B:
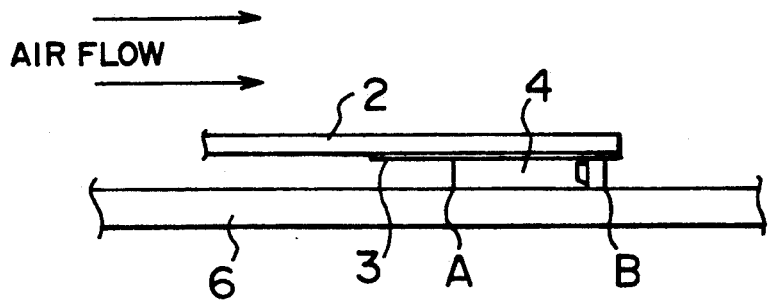
Figure 5A:
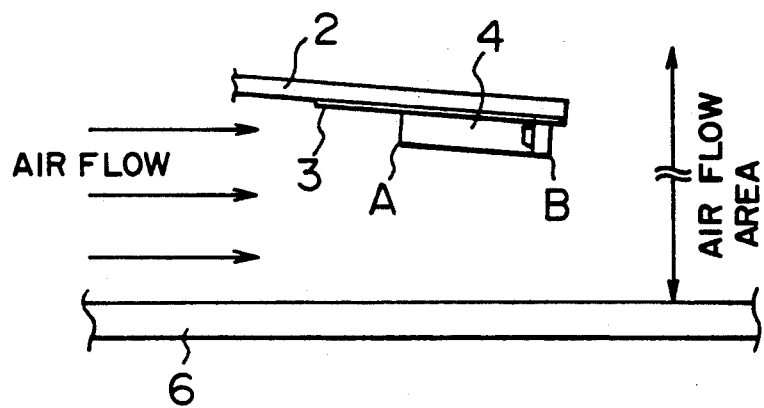
FIGS. 5A and 5B are side views showing how the magnetic head moves according to the loading method of this embodiment.
Figure 5B:
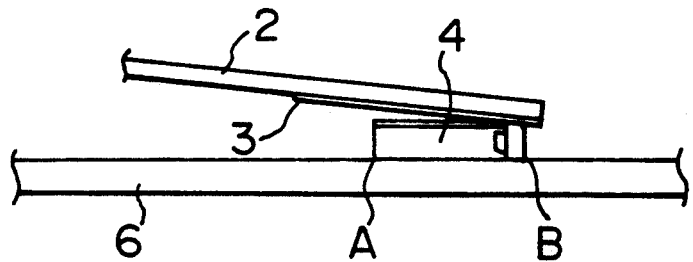

FIGS. 4A and 4B are side views showing the process whereby the magnetic head floats according to the loading method of the prior art. FIG. 4A shows the condition in which the magnetic head 4 has entered into the air flow area produced on the surface of the disk 6 by the rotation of the disk 6. From this figure, it can be seen that the magnetic head 4 comes closer to the disk 6 at the upstream end A of the magnetic head 4 in the method of the prior art. The magnetic head 4 finally enters into the floating state, as shown in FIG. 4B. FIGS. 5A and 5B are side views showing how the loading method in this embodiment causes the magnetic head to float. FIG. 5A shows the condition in which the magnetic head 4 has entered into the air flow area. In this figure, it can be seen that the magnetic head 4 comes closer to the disk 6 at the downstream end B in the case of this embodiment. The magnetic head 4 finally enters into the floating state, as shown in FIG. 5B.

Figure 6A:
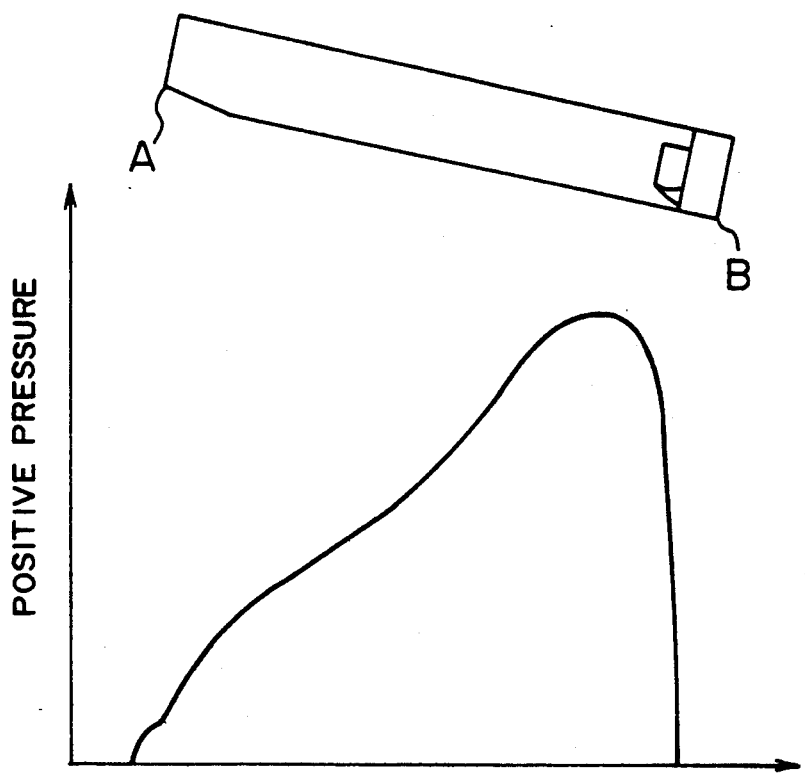
FIGS. 6A and 6B are graphs showing the distribution of positive pressure generated in the magnetic head, respectively, in the loading methods of this embodiment and of the prior art.
Figure 6B:
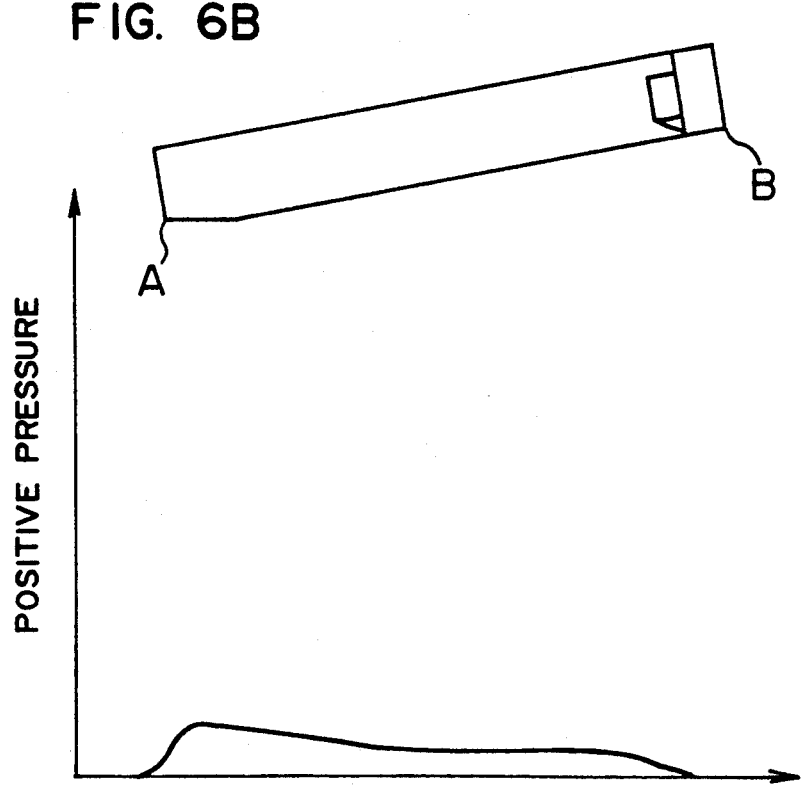
Figure 7:
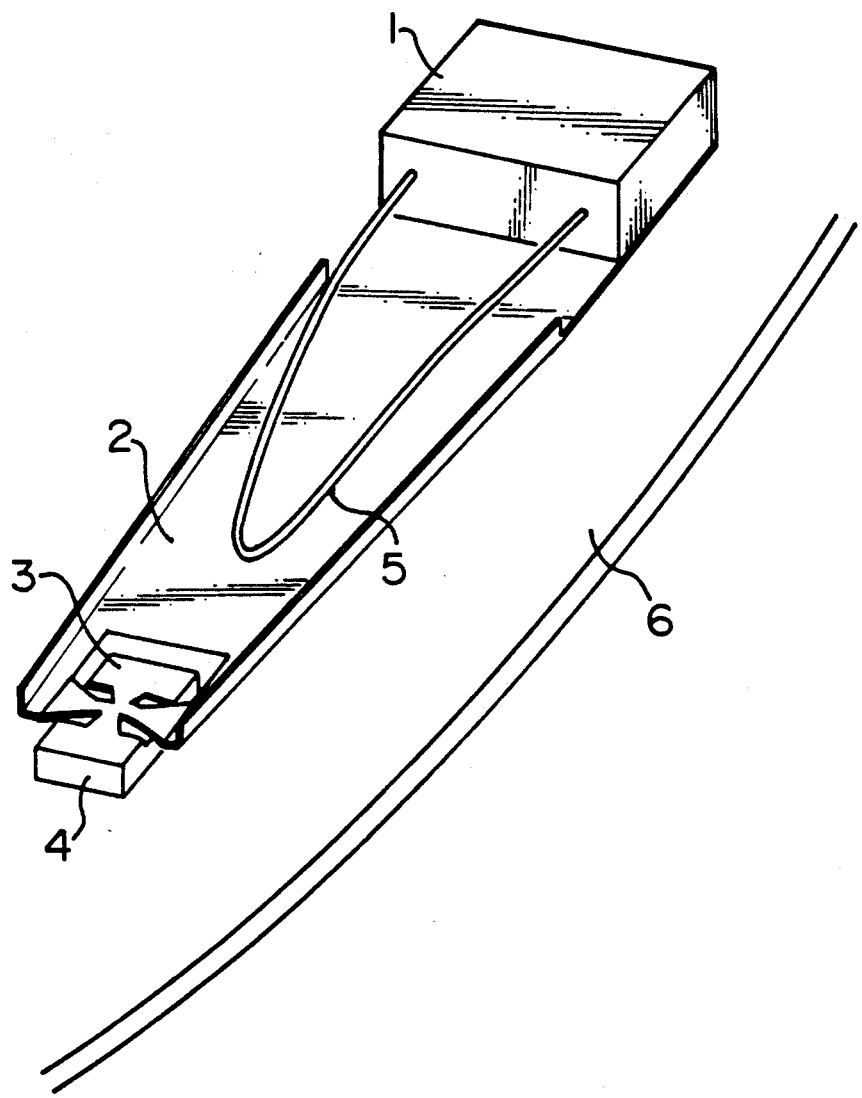
FIG. 7 is a partially enlarged perspective view of a magnetic disk drive unit.
Figure 8:
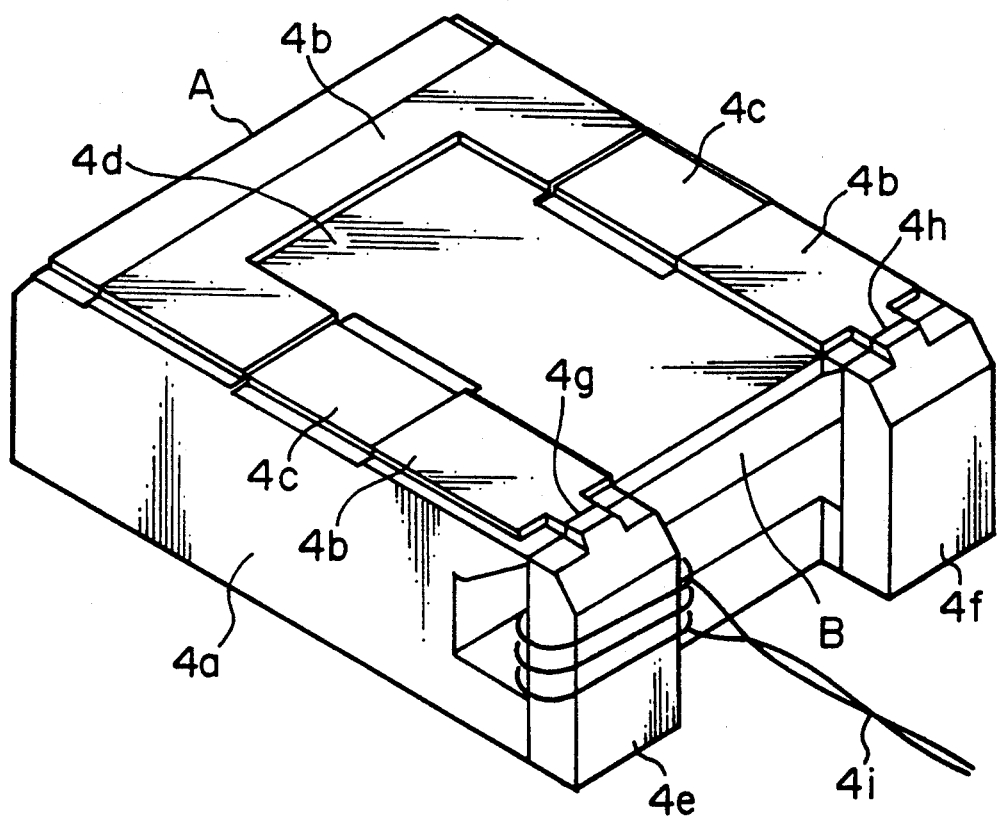
FIG. 8 is a perspective view of the magnetic head.

When the magnetic head 4 enters into the air flow area shown in FIGS. 4A and 5B, a positive pressure is generated. At this time, a positive pressure acting on the magnetic head 4 is larger when the magnetic head 4 moves perpendicularly to the disk at the downstream end B as in this embodiment than that when the magnetic head 4 moves in the air flow area perpendicularly to the disk so as to come closer to the disk 6 at the upstream end A. The reason for this will be explained with reference to FIGS. 6A and 6B. FIG. 6A is a graph showing the distribution of positive pressures generated in the magnetic head 4 in the air flow area when the magnetic head 4 is brought closer to the disk 6 at the downstream end B. FIG. 6B is a graph showing the distribution of positive pressures generated in the magnetic head 4 in the air flow area when the magnetic head 4 is brought closer to the disk 6 at the upstream end A. As can be seen from these two graphs, a positive pressure is generated which is greater when the magnetic head 4 is brought closer to the disk 6 at the downstream end B than at the upstream end A. Thus, when the magnetic head 4 is moving perpendicularly to the disk 6 in the air flow area, a force relatively larger than that obtained by the prior art is applied to the magnetic head 4 in the direction in which the magnetic head 4 moves away from the disk 6. As a result, since a force that prevents the magnetic head 4 from moving in the direction of the disk 6 is applied to the magnetic head 4 before the magnetic head 4 comes closer to the disk 6 and reaches a floating position, the probability that the magnetic head 4 will make forcible contact with the disk 6 becomes very small in this embodiment. That is, since the disk 6 is hardly damaged during such a loading procedure, a special area for floating the magnetic head is not required, unlike the prior art, and the storage capacity of the disk 6 can be made larger than that in the prior art. In this embodiment, since the magnetic head 4 floats in a state in which the gimbal 3 is bent, there has been a risk that vibrations applied to the disk 6 will cause the magnetic head 4 to make contact with the disk 6 during the floating of the magnetic head 4. From the results of the actual experiment, even if vibrations are set up in the disk 6, etc., it was found that the magnetic head 4 can precisely follow the recording surface of the disk 6 during the floating of the magnetic head.

As has been explained above, according to this embodiment, the magnetic head 4 is brought closer to the disk 6 at the downstream end B of the magnetic head 4. Thus, when the magnetic head 4 is moving perpendicularly to the disk 6 in the air flow area, a force larger than that in the prior art is generated. As a result, since this makes it possible to prevent the magnetic head 4 from bumping against the disk 6 and from damaging the disk 6, the necessity of a special area for floating the magnetic head can be eliminated and the storage capacity of the disk 6 can be increased.

Various changes and modifications can be made to the above-described embodiment of the present invention without departing from the spirit and scope thereof, and therefore, it is understandable that this invention should not be limited to the specific embodiment described above but to that defined in the appended claims.

What is claimed is:

1. A method of loading a magnetic head, said method comprising:

positioning a magnetic head, having a floating surface, in a parked position above a recording medium which is moving relative to the magnetic head in a movement direction from an upstream end to a downstream end of the magnetic head to induce an air flow which travels along the floating surface of the magnetic head in a direction from the upstream end to the downstream end of the magnetic head, such that the upstream end of the magnetic head is closer to the recording medium than is the downstream end of the magnetic head;

thereafter moving the magnetic head toward a loaded position by causing the magnetic head to move through a position at which the upstream end and the downstream end of the magnetic head are equally spaced from the recording medium and a position at which the downstream end of the magnetic head is closer to the recording medium than is the upstream end of the magnetic head so as to thereafter approach the recording medium with the downstream end of the magnetic head being closer to said recording medium than is the upstream end of the magnetic head; and thereafter allowing the magnetic head to float in said air flow above said recording medium in said loaded position.

2. A method of loading a magnetic head as claimed in claim 1, wherein the magnetic head includes a negative pressure type slider.

3. A magnetic disk drive unit, comprising:

a magnetic disk having at least one recording surface;

an arm supported for movement along said recording surface of said magnetic disk;

a flexure member mounted on said arm;

a magnetic head having a floating surface and mounted on said flexure member by a gimbal means, said magnetic disk being adapted for movement relative to said magnetic head in a movement direction from an upstream end to a downstream end of the magnetic head to induce an air flow which travels along the floating surface of the magnetic head in a direction from the upstream end to the downstream end of the magnetic head such that the magnetic head tends to float above the magnetic disk in said air flow, said magnetic head being positioned by said flexure member initially in a parked position such that said upstream end of the magnetic head is closer to said recording surface of the magnetic disk than is the downstream end of the magnetic head; and a pressing member for moving said flexure member to move said magnetic head toward a loaded position by causing said magnetic head to move through a position at which the upstream end and the downstream end of the magnetic head are equally spaced from the recording medium and a position at which the downstream end of the magnetic head is closer to the recording medium than is the upstream end of the magnetic head so as to thereafter approach said recording surface of the magnetic disk with the downstream end of the magnetic head being closer to said recording medium than is said upstream end of said magnetic head and to move toward the magnetic disk until a gap between the magnetic head and the recording surface of the magnetic disk has a predetermined magnitude.

4. A magnetic disk drive unit as claimed in claim 3, wherein the magnetic head includes a negative pressure type slider.

5. A magnetic disk drive unit as claimed in claim 3, wherein said pressing member presses said flexure member to cause the magnetic head to move closer to the recording disk.

* * * * *